United States Patent [19]
Vola et al.

[11] 3,833,296
[45] Sept. 3, 1974

[54] OPTICAL SCANNING SYSTEM FOR PHOTOCOPYING

[75] Inventors: Mathias J. J. M. Vola, Venlo; Willem P. H. A. Janssen, Blerick, both of Netherlands

[73] Assignee: Oce-van der Grinten N.V., Venlo, Netherlands

[22] Filed: Nov. 8, 1972

[21] Appl. No.: 296,800

[52] U.S. Cl. ............................ 355/51, 355/8, 355/57, 355/66
[51] Int. Cl. ............................................ G03b 27/50
[58] Field of Search ............. 355/57, 66, 75, 65, 50, 355/51, 8

[56] References Cited
UNITED STATES PATENTS
3,609,024  9/1971  Suzuki ............................. 355/66 X

*Primary Examiner*—Richard A. Wintercorn
*Attorney, Agent, or Firm*—Albert C. Johnston

[57] ABSTRACT

An electrophotographic copying apparatus having a movable mirror system for stripwise scanning an original laid on a support and directing the resulting light image stripwise via a stationary objective to a moving light sensitive medium is provided with a stationary slit located to a side of said support for exposure of a sheet-shaped original moved over the slit and with means including at least one mirror of the movable mirror system for stripwise projecting the light image from an original at the slit via said objective to the imaging medium. A single objective and imaging system thus serve for copying either sheet-shaped originals passed over the exposure slit or originals of various forms, including books, laid on said support.

7 Claims, 2 Drawing Figures

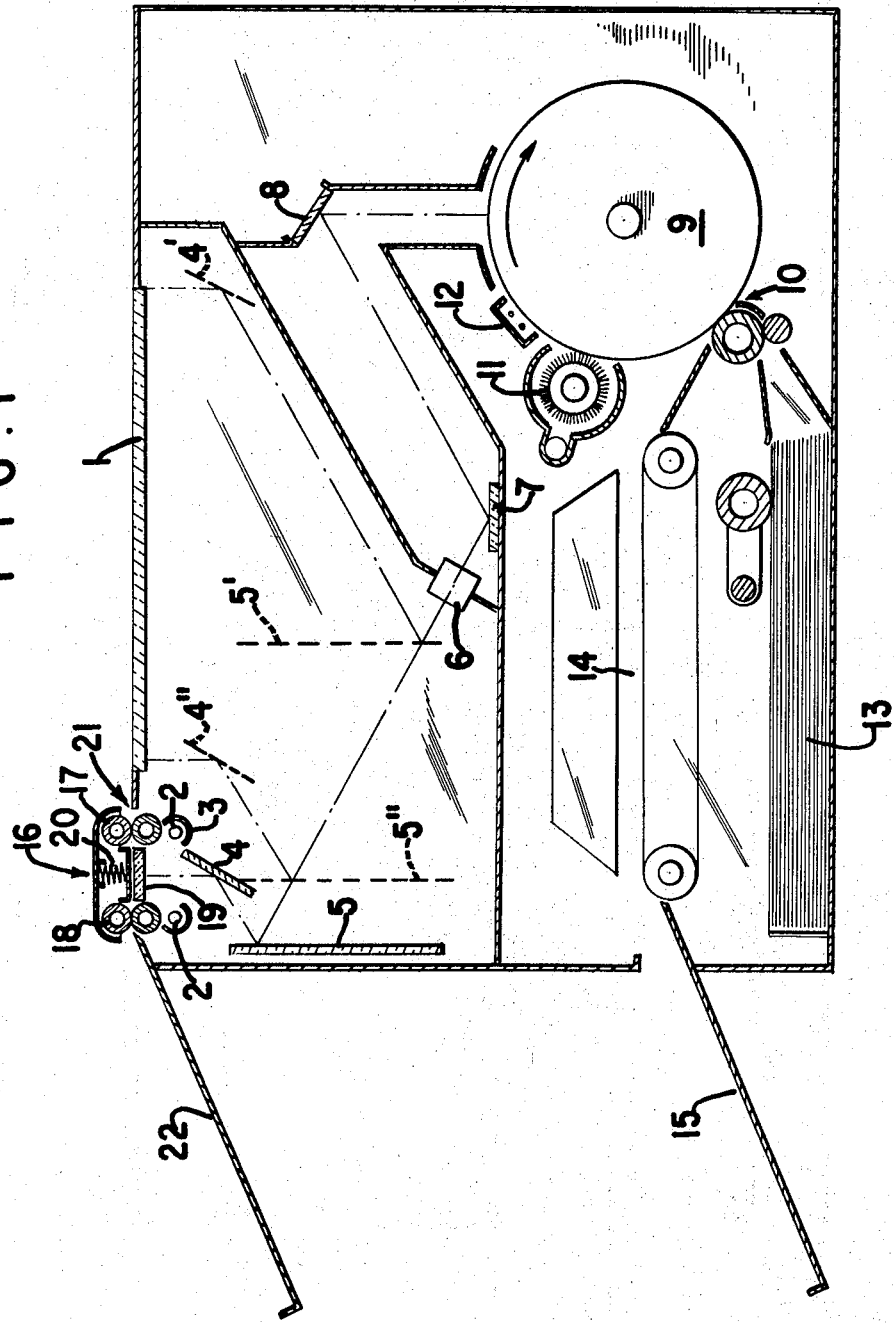

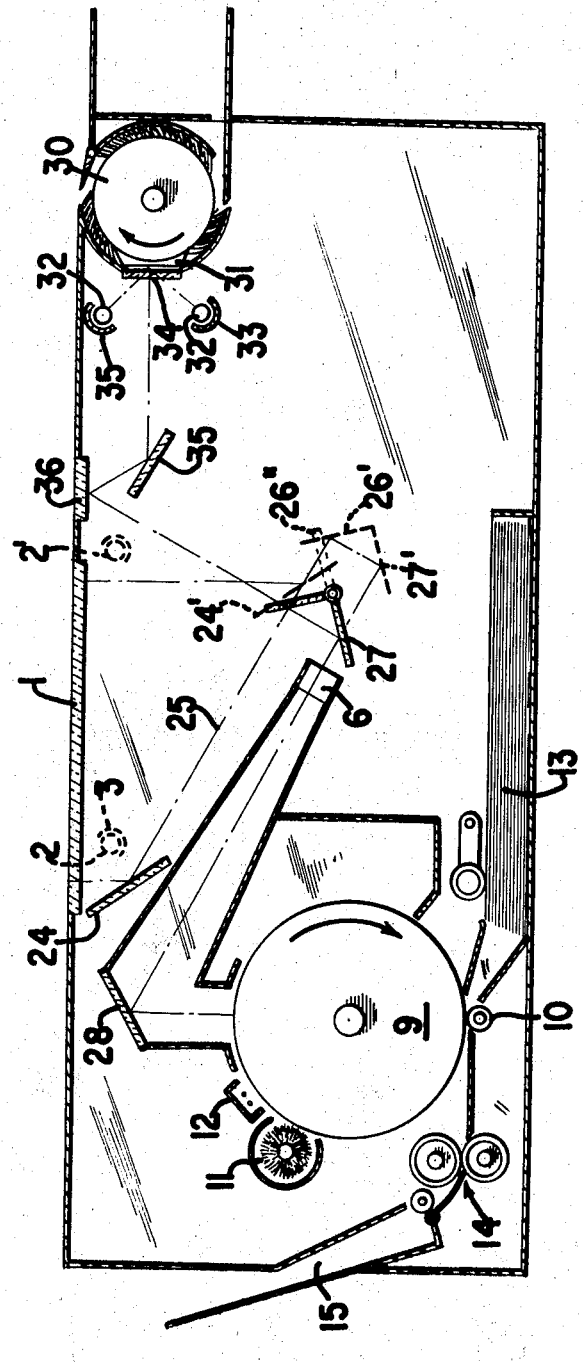

OPTICAL SCANNING SYSTEM FOR PHOTOCOPYING

This invention relates to an improved optical scanning system for photocopying apparatus. The invention is an improvement of a type of apparatus having an optical scanning system which comprises an objective and a movable mirror system and in which, when this mirror system is moved from one end position to another, a light source providing a strip of light scans an original lying on a support so that light rays reflected to form an image of the original are projected onto a moving light-sensitive layer.

In a known apparatus of that type, as shown in U.S. Pat. No. 3,543,290, originals placed on a glass plate are exposed stripwise by passing below them a light source to which a mirror is rigidly attached, so that the mirror directs the light reflected by the original to a second mirror arranged perpendicular to the plane of the glass plate, and the band of light rays is deflected to a fixed objective having its axis inclined relative to the glass plate. Upon then passing through the objective and a fixed mirror the reflected light finally reaches a moving light-sensitive layer to generate a latent image thereon.

Such known apparatus is quite suitable for making copies from books and the like. It has, however, an important disadvantage in that after scanning the original the optical system must be returned to its initial position before a subsequent copy can be made. This results in much loss of operating time. The inefficiency of such a procedure is particularly evident when single-sheet originals are to be copied instead of pages from books.

The object of this invention is to provide an improved optical scanning system for apparatus of the type mentioned and to render such apparatus more suitable for copying single-sheet originals.

According to the present invention, an apparatus is provided of the type mentioned in the opening paragraph, in which a stationary exposure slit is provided at a location to a side of the support upon which originals may be laid to be copied, so that light reflected through this slit when the mirror system is held in a certain position will be directed into the objective and thence to the moving light-sensitive layer in the path used for the reflected scanning light, and means are provided to carry sheet-shaped originals over the exposure slit.

In this way apparatus is obtained in which, with the use of one and the same objective and image-forming system, single-sheet originals can be passed quickly through an exposure station for slit exposure, and even in an uninterrupted succession if so desired, yet it is also possible to copy originals such as books which normally cannot be passed mechanically through an exposure station suited for sheet-shaped originals in motion.

The invention can be carried out in various ways.

For instance, the scanning system with movable mirrors may be caused to occupy a rest position so located that when it is in that position the scanning light is directed automatically to the exposure slit.

According to another embodiment, the scanning system is designed so that when the movable mirrors are in an end position at least one of these mirrors can be displaced (pivoted away or shifted aside) out of its normal position, in which it directs light reflected from originals on the said support into the path to the objective, so as to occupy another position in which light reflected from originals at the exposure slit will be directed into that same path.

Photocopying apparatus of the type described often has an odd or an even number of mirrors, depending upon the process employed. When switching from copying books and the like to copying sheet-shaped originals, an odd or even number of active mirrors, respectively, must of course still be used in order to obtain legible copies in both working conditions. Accordingly, when so switching the working conditions the number of active mirrors either must remain unchanged or must be changed by two or a multiple of two. According to the invention this requirement can be fulfilled in a convenient manner by providing in the mirror system at least two mirrors ahead of the objective, as viewed in the direction from said support along the path of the reflected light, and mounting the second mirror, and viewed in the same direction, so that it can be hinged away or shifted aside. In this way, by moving only one mirror two mirrors are made either active or inactive.

Normally, the support for receiving originals to be copied is a horizontal glass plate, and the means for carrying the sheet-shaped originals along the exposure slit desirably is arranged horizontally adjacent to this glass support plate. This provides a practical arrangement of the two copying systems, with good accessibility of the two, a minimum requirement of space, and other conveniences.

The movable mirror system of a copying apparatus according to the invention may comprise two mirrors which normally are disposed so as to define an angle of 90° and are movable together as a unit in a path inclined relative to the plane of the said support for originals to be copied, and which are so mounted that one of these mirrors, preferably the one first struck by the light reflected from originals on said support, is displaceable out of the path of that light by being pivoted away or shifted aside.

Another suitable movable mirror system may comprise a mirror which normally is perpendicular to the plane of said support yet can be pivoted away or shifted aside, in which case the light reflected from an original through the fixed exposure opening or slit preferably passes directly to the objective, i.e. without the interposition of a mirror. In this case the sheet transport means and the fixed exposure opening are arranged to a side of the glass plate other than that which they occupy in the more normal arrangement referred to above, yet the position of the objective and the path of the light transmitted through it remain unchanged.

The invention can be embodied advantageously in apparatus in which the standstill position occupied by the mirror system in order to expose sheet-shaped originals passing over the exposure slit is located outside the path which the mirror system follows when scanning originals lying on said support. Thus the horizontal dimensions of the apparatus can be kept small, enabling optimum utilization of the available space.

The invention will now be further explained in the following detailed description and by reference to the accompanying drawings of illustrative embodiments thereof.

In the drawings:

FIG. 1 is a schematic view of an apparatus according to the invention, in which the mirror system in one end position is aimed directly at the stationary exposure slit; and FIG. 2 is a schematic view of another embodiment of the invention, in which one of the movable mirrors can be displaced out of its normal active position in order to provide an effective path for light reflected through the exposure slit.

Referring first to FIG. 1, the photoprinting apparatus as there shown includes a horizontal glass plate 1 fixed in the upper part of the frame of the apparatus. Originals of various forms, including books, can be laid on the upper surface of this plate for being copied.

Beneath the glass plate 1 there is a set of two lamps 2 provided with reflectors 3 and determining the size of an exposure slit betweem them. The lamps are rigidly connected with an oblique mirror 4 situated below them. This mirror coacts with a lower, large mirror 5 arranged vertically. The parts 2, 3 and 4 are mounted on a carriage, not shown, which is movable in a horizontal direction beneath the glass plate 1 between end positions represented, respectively, by the full line showing of mirror 4 at the lefthand side of FIG. 1 and the dotted lines showing of the same mirror at 4' at the right-hand side of the glass plate. The mirror 5 is also mounted on a carriage which, when mirror 4 occupies the position indicated at 4', causes mirror 5 to occupy the position indicated in dotted lines at 5', and when mirror 4 occupies the position shown in full lines causes mirror 5 to occupy its position shown in full lines at the left. The carriage for mirror 5 is so connected with the drive of the carriage for mirror 4 that mirror 5 moves at half the horizontal speed of mirror 4.

An objective (lens) 6 is installed in a fixed position with its axis lying oblique to the plane of the glass plate 1. This objective conducts the band of light reflected from an original on the glass plate and thence via mirrors 4 and 5 to a horizontal mirror 7 which reflects the light to a mirror 8, whence it falls onto a light-sensitive surface on drum 9. A number of known processing stations is situated about drum 9, such as for developing the image (not shown), transferring the image at 10 to a copy sheet, cleaning the drum surface at 11, and corona-charging at 12. From a stock of copying paper at 13 sheets are successively supplied in known manner to the transfer station 10 where each sheet receives from drum 9 a toner image which is then fixed at 14, after which the finished copies are deposited in a tray at 15. The speed of drum 9 is of course so adapted to that of the mirrors 4 and 5 that when making a copy from an original lying on glass plate 1 a sharp image is produced on drum 9. The difference in speed between the mirrors 4 and 5 ensures that the distance of travel of the light to the fixed objective stays constant during the copying processes.

According to the invention, an exposure device 16 is arranged horizontally adjacent to the glass plate 1. This device comprises pairs 17 and 18 of conveyor and guide rolls which are spaced apart horizontally with a transparent guide 19 disposed between them and a spring-pressed flattening device 20 disposed over guide 19, for feeding sheet-shaped originals introduced into the exposure device 19 at 21. Upon passing through this device these originals are deposited into a tray at 22. If desired, the originals can be slid in flat condition over the glass plate 1 which will guide them into device 16 at 21, so that they are kept flat.

Whenever it is desired to copy single sheets as quickly as possible, instead of copying an original lying still on glass plate 1, such sheets are fed to the device 16 at 21, while the mirror system 4, 5 is held in the position thereof shown by full lines. This full-line position can be the end position occupied by the mirror system when an original lying on glass plate 1 is to be copied, but in such case the mirror system 4, 5 would have to move further to and fro than strictly required. Preferably, during the copying of originals laid on glass plate 1, the mirror system is driven in such a way that mirror 4 moves only from an initial position shown at 4'' up to position 4', and then quickly returns to the initial position in which mirror 5 is in the location indicated at 5''. Then, when it is desired to utilize exposure device 16, a simple reversal sufficies for displacing the mirror system 4, 5 to the position shown by full lines and keeping it there for as long as device 16 is being used.

Accordingly, an apparatus is provided which is suitable for varied modes of use and which enables quicker copying of ordinary sheets than is the case with books; yet the overall size of the apparatus need be only slightly larger than that required for an apparatus capable only of copying originals lying still on a support such as glass plate 1.

The embodiment of the invention illustrated in FIG. 2 differs somewhat in arrangement and design from that shown in FIG. 1. According to FIG. 2, a lamp 2 having a reflector 3 is arranged beneath the glass plate 1 on a carriage which is movable horizontally. A mirror 24 is mounted on a carriage for movement along a line 25 inclined at an angle relative to the plane of the glass plate 1, but in such a way that the horizontal component of the movement of mirror 24 is identical to that of the movement of lamp 2 and reflector 3. A common carriage thus can be used for the horizontal movements of lamp 2 and mirror 24, with provision on this combined carriage, such as a sloped guide, causing mirror 24 to move diagonally downwards and upwards relative to the horizontal path of the lamp.

To the right-hand side of the objective 6 in this embodiment a system of two mutually perpendicular mirrors 26 and 27 is mounted. Objective 6 conducts the light-rays received and reflected by this mirror system to a mirror 28 from which this light is projected onto the drum 9, which again has the usual processing stations including developing means (not shown) to the right of its axis, a station at 10 for transferring the image to the copying paper fed from a stock of copying paper at 13, and a station for fixing the image onto the copies at 14 and depositing the copies at 15. Just as in FIG. 1 the light-sensitive drum 9 rotates in the direction of the arrow at a speed adapted to the speed of movement of the mirros.

When the lamp 2 and the mirrors 24, 26 and 27 occupy the position shown in full lines, this system copies part of an original lying on the left-hand side of glass plate 1. Upon then moving this system to the right, the lamp 2 eventually reaches the position 2' shown by dashed lines and the mirror 24 reaches a corresponding position shown at 24'. As the lamp 2 and the mirror 24 move to the right, the mirror system 26, 27 also moves to the right but at a much lower speed relative to the horizontal speed of the lamp 2. The speed relationship is represented by the factor $(1 - \sin \alpha)/2\cos\alpha$, in which α is the angle made by the line 25 with the horizontal. Consequently, in the position 24' of mirror 24 the mirror system 26, 27 has reached the position indicated at 26', 27'. The distance of travel of the light again remains constant when copying in this way.

To the right-hand side of glass plate 1 there is a transport cylinder 30 for originals. This cylinder is provided with guide means for moving sheet-shaped originals along a flat window 31 so that these originals are temporarily and locally removed from the circumference of the cylinder 30 along the window and then are moved back again onto the cylinder. Such a transport device for exposing sheet-shaped originals is disclosed in published Dutch Patent Application 68.05332. To the left-hand side of window 31 are two lamps 32 having reflectors 33. These expose the sheet-shaped originals in a vertical flat path, in which they are screened off and guided by a glass plate 34. The light-rays reflected from this exposure travel to a mirror 35 and thence to a mirror 36.

When this apparatus is to be used for making copies from sheet-shaped originals, the mirrors 24, 26 and 27 are set in their left-hand end positions shown in full lines, but mirror 26 is pivoted backwards to a position out of the path of the light projected by the fixed mirrors 35 and 36, as indicated by the broken line at 26''. Consequently, the light from mirror 36 is deflected by mirror 27 into and through the objective 6, for the making of copies as above described. It will be noted that in reaching the objective 6 in this embodiment the image-forming light is always reflected by three mirrors, no matter whether copies are being made from the glass plate 1 or from the sheet exposing device at 30, 31.

Here again the distance of travel of the light is the same for both methods of copying. In order to achieve this effect in the arrangement shown, device 30 is positioned relatively far to the right of the glass plate 1 and the mirrors 35 and 36 are employed. These requirements, however, can be avoided by positioning the device 30 above and to the right-hand side of the glass plate 1. A shorter apparatus can also be obtained by choosing a larger angle α, for the inclined path of the movable mirrors. In this way the path 25 of the light is inclined downwards at a steeper angle, causing the distance between mirror 27 and mirror 36 to become larger too and, consequently, the distance between mirror 35 and cylinder 30 becomes smaller. The best spatial solution can of course be chosen on the basis of these and other considerations, depending upon the intended conditions of use of the apparatus or upon specific demands to be met.

What is claimed is:

1. In a photocopying apparatus comprising a support upon which an original may be laid for exposure, a moving light-sensitive medium and an optical system including a stationary objective for transmitting light into a path to said medium and means including a mirror system movable from one end position to another relative to said support for stripwise scanning an original laid on said support and projecting the resulting light image through said objective into said path, the improvement wherein said apparatus further comprises a stationary exposure slit located to a side of said support, means for transporting a sheet-shaped original over said slit, and means including at least one mirror of said mirror system operative in a certain posture thereof for projecting stripwise through said objective into said path the light image resulting from exposure of an original moving over said slit.

2. Photocopying apparatus according to claim 1, said at least one mirror being displaceable from a normal position thereof in which the same directs to said objective light from an original on said support to another position thereof in which it guides to said objective light from an original at said exposure slit.

3. Photocopying apparatus according to claim 1, said mirror system in said certain posture thereof being disposed outside the scanning path which it follows between the said end positions.

4. Photocopying apparatus according to claim 1, wherein said support is substantially horizontal and said exposure slit and said transporting means are disposed substantially horizontally adjacent to a side of said support.

5. Photocopying apparatus according to claim 1, said movable mirror system comprising at least two mirrors ahead of said objective, the second of which viewed in the direction of travel of light from said support to said objective, is displaceable from normal position into the said posture.

6. Photocopying apparatus according to claim 1, said movable mirror system including two mutually perpendicular mirrors and means acting during movement of said mirror system between the said end portions to move said two mirrors as a unit in a path inclined to the plane of said support with each of said two mirrors disposed at an angle of 45° to said inclined path, the one of said two mirrors first struck by light from an original on said support being displaceable out of active position when said mirror system is at a certain location to a posture thereof such that the other of said two mirrors will then direct light from an original at said slit into said objective and thence into the path to said light-sensitive medium.

7. Photocopying apparatus according to claim 6, said movable mirror system comprising three mirrors, the first of which is moved along said inclined path with but at a speed greater than that of said two mirrors, said exposure slit being mounted at a distance horizontally away from a side of said support, and there being two fixed mirrors for directing light from an original at said slit to said other of said two mirrors when said mirror system is at said certain location and said one of said two mirrors is displaced out of active position.

* * * * *